April 18, 1939.  H. ARMSTRONG ET AL  2,154,829
METHOD OF AND APPARATUS FOR ILLUMINATING A
CHROMATICALLY VARIEGATED DISPLAY
Original Filed July 6, 1937   3 Sheets-Sheet 1

INVENTORS
HENRY ARMSTRONG
RALPH S. S. JONES

Stone, Boyden + Mack
ATTORNEYS

INVENTORS
HENRY ARMSTRONG
RALPH S.S. JONES

Stone, Boyden & Mack
ATTORNEYS

Patented Apr. 18, 1939

2,154,829

UNITED STATES PATENT OFFICE 2,154,829

METHOD OF AND APPARATUS FOR ILLUMINATING A CHROMATICALLY VARIEGATED DISPLAY

Henry Armstrong, Montreal, Quebec, and Ralph S. S. Jones, Toronto, Ontario, Canada, assignors to Vibra-Lite Limited, Montreal, Quebec, Canada, a corporation of Canada Application July 6, 1937, Serial No. 152,250
Renewed September 10, 1938

30 Claims. (Cl. 40—130)

Our present invention comprehends the provision of a novel method for illuminating displays and novel display apparatus intended to be used for advertising, educational, amusement and other purposes.

In particular, the invention appertains to the art of displays primarily adapted for outdoor advertising purposes, wherein an appearance of colour fluctuation and/or object representation or indicia animation is produced by the coordination of projected radiation with coloured display surfaces.

The greatest difficulty encountered by known types of outdoor signs employing selecting spectral absorption and reflection of the display surface colours to produce an appearance of object representation or indicia animation, is the interfering with the coloured illumination by extraneous light sources. It is essential in this type of display animation that a coloured portion of the display surface which at one moment is rendered non-dominant by absorbing the coloured light directed to it, be not rendered dominant by reflecting extraneous incidental light. This perfect condition seldom obtains in commercial advertising. In order to accentuate the colour change or the appearance of animation it has been the natural procedure to recurrently flood the display surface with beams of light having as great a chromatic difference as possible.

Heretofore, incandescent type light sources with substantially continuous spectrum, associated with filtering media, have been used for display illumination of the character above defined. To produce coloured light according to the foregoing, it is necessary to filter out all undesirable or unused colours and permit projection of the one portion or colour band utilized. This is a very inefficient process and in order to overcome even the mildest of incidental light on the display surface, the ratio of electric current consumption with respect to display illumination intensity must be so great that the operating cost is prohibitive.

In contradistinction to the foregoing, our present invention has as an object the provision of a novel method of and apparatus for illuminating a chromatically variegated display of the aforementioned character, to afford an appearance of vivid display colour fluctuation and/or dominant object representation animation, which, although the display be subject to strong incidental light, is most effective from an advertising viewpoint, and which is exceptionally economical in electric current consumption.

In its preferred form the invention resides in illuminating a display surface bearing contrastingly different shades of non-neutral colour to produce varying visual impressions, by continuously transmitting radiation from a light source of line spectrum character to the display surface, which radiation contains shades of colour similar to shades of colour of the display surface and is deficient in one of the display surface and tri-chromatic colourimeter colours, intermittently interposing media in the radiation emitted from the said light source to reduce the apparent intensity of such radiation transmitted from the display surface to the eye of the observer, and transmitting radiation from a light source emitting a light beam containing a shade of colour deficient in the radiation emitted from the aforesaid light source and embodied in the display surface, to the display surface during each aforesaid event of apparent display surface illumination intensity reduction.

The present method of display illumination is not restricted to any particular schematic arrangement of object representations and background. Dominant non-neutral shades of colour can be advantageously utilized, particularly where long distance vision is a requisite characteristic. In particular, the method herein disclosed is well adapted for illumination of displays embodying "gradated" or chromatically variegated display surfaces, indicium and object representations of the character disclosed in United States Letters Patent No. 2,078,142, dated April 20, 1937. According to the subject matter of the aforesaid Letters Patent, red and analogous shades of colour are best adapted in such cases where dominance is an incumbent factor, and in this respect the method of illumination herein disclosed may be advantageously utilized.

Assume for purposes of explanation that the display surface to be illuminated bears a gradated object embodying red, red-orange, orange, orange-yellow, yellow and white, formed in gradations or, in other words, stripes co-related to afford an appearance of gradually increasing or decreasing chroma as viewed from one part of the object to another part thereof, and that the said object is associated with a blue background. Assume also that the display is operating after sunset and is subject to incidental light emanating from extraneous light sources and that such incidental light is of such intensity that the normal eye could readily discern the formation and colour treatment of the display object and its background if the display were not illuminated according to the method herein disclosed.

According to the present method of illumination, the display is flooded with light of line spectrum character, which radiation is deficient in one dominant tri-chromatic colourimeter colour. In other words, let it be assumed that the display surface is continuously flooded with radiation emitted from a mercury vapour electric discharge light source, and that filtering media is intermittently interposed in the radiation which floods the display surface to reduce the intensity of reflected light. Accordingly, the display is continuously flooded with substantially all the colours and shades of colours of the spectrum, except shades of red and red-orange, and essentially the intensity of illumination is such that those portions of the object bearing shades of red and red-orange, although subject to strong incidental light as aforesaid, appear to the normal eye to be shades of dark brown. Other shades of colour embodied in the object and background as above referred to appear to be brilliantly illuminated substantially the same as when viewed under noon sunlight. Part of the mercury vapour radiation is subsequently filtered, in this case preferably by interposing blue, green and yellow filtering media in the radiation in close proximity to the light source. Thus part of the wave bands are filtered out or are substantially subdued and due to reduction of the amount of blue, green and yellow shades of light transmitted to the display, the intensity of illumination appears to be reduced. At this moment radiation of or embodying a hue substantially deficient in the aforesaid mercury vapour radiation, namely radiation including shades of red, is caused to impinge the display. Preferably the radiation containing shades of red is caused to progressively increase in intensity to a predetermined maximum, remain at such for a moment and subsequently decrease progressively in intensity until substantially extinct. The filtering media is then retracted from out of the mercury vapour radiation, thus completing one cycle of display illumination. Due to the differentiation in the reflection characteristics of the display colours, and appearance of display object animation is afforded.

An important characteristic of the present method of illumination resides in the flooding of the display momentarily during each illuminating cycle with non-filtered mercury vapour radiation at substantially peak reflected intensity. By this method those areas of the display which under noon sunlight appear to the normal eye to be red, are momentarily caused to appear to be dark brown, while other areas of the display bearing spectral colours other than red are momentarily brilliantly illuminated. Subsequently red shades of colour are caused to appear to change from dark brown to red. The recurrent appearance of intense brilliance of spectral shades of colour deficient in red, alternated with the appearance of brilliant illumination of areas bearing shades of red, affords an attention compelling spectacle, particularly where areas of gradated colours as above referred to form part of the display.

In its preferred form the invention comprehends the provision of a display of the character set forth embodying a display surface including contrastingly different shades of colour, and apparatus arranged to illuminate the said display surface with cyclically changing beams of light to produce varying visual impressions, which apparatus includes means to continuously flood the said display surface with radiation deficient in one only of the colours of the tri-chromatic colourimeter, and additional means arranged to intermittently flood the said display surface with radiation containing a shade of colour which is deficient in the radiation emitted from the aforesaid means.

Furthermore the invention resides in the combination with a display surface embodying contrastingly different shades of non-neutral colour, of apparatus arranged to flood the said display surface with cyclically changing radiation to produce varying visual impressions, which apparatus includes means to intermittently flood the display surface with non-filtered spectral radiation substantially deficient in one of the display surface colours and one of the colours of the tri-chromatic colourimeter; further means co-acting with the aforesaid means arranged to filter radiation emitted therefrom following each aforesaid intermittent event of illumination to reduce the apparent intensity of display surface illumination by such radiation; and additional means arranged to flood the said display surface during each filtration event aforesaid with radiation containing a colour deficient in the filtered radiation and embodied in the display surface.

The invention includes the features and combination of features as hereinbefore and hereinafter described and/or illustrated in the accompanying drawings together with all such equivalents therefor and modifications thereof as lie within the scope of the appended claims.

In the accompanying drawings which illustrate one of many possible embodiments of the invention, but to the details of which the invention is not confined:

Fig. 1 is a top plan view of a display of the type suitable for outdoor advertising purposes, with which is corelated illuminating apparatus of the character hereinbefore and hereinafter referred to;

In the description which follows and in the appended claims reference is made to the term "display" and/or "display surface." Such term is intended to include any form of display or display surface of any character upon or associated with which there is represented matter to be displayed and regardless of the character of the matter.

By the terms "display object" and "object representation" and/or "indicia" or "indicium", we mean letters, figures, arbitrary designs, marks indicating movement, representations of objects or parts of objects, or even objects themselves, affixed to or standing in front of the background, to which the attention of an observer is to be particularly directed or which serve to direct attention to the whole or some part of the remainder or background of the display, for the purpose of conveying or emphasizing the message which the display is designed to give. The objects, object representations or indicium may be arranged at a single location or at a plurality of spaced locations in or on the display surface, and may constitute one or more of the display portions, the other portion or portions being background.

The term "chromatically variegated", as applied to the display surface, is to be taken as meaning, coloured in a variety of spectral hues, in the arrangement of which irregularity is not essential.

The term "gradated" as herein used is intended to mean the visual impression upon the retina of an observer of a chromatically variegated surface, which when viewed from one part to another part appears to reflect light in increasing or decreasing wave length, increasing or decreasing chroma, or in increasing or decreasing value, either in indistinguishable steps or by perceptible increment.

The term "chroma" as herein used is intended to designate that attribute of a colour by virtue of which the normal eye perceives in addition to hue, the presence or absence of grey.

"Light" means, according to context, radiation as it emanates from a source, or as it is modified by passage through a colour screen of filter, or by reflection or refraction.

By "light of line spectrum character" we mean radiant energy radiating in the range of wave lengths which are well known to actuate human optical vision and which range of wave lengths are not continuous from the short wave lengths to the long wave lengths and may extend from a single line or wavelength to a multiplicity of lines or bands.

"Neutral colours" refer to such colours as do not materially change under the spectral colours by which the display object, object representation or indicium are displayed, or in other words, those which display no decided colour characteristics such as relate to primary or non-neutral colours, and remain of the same apparent intensity under complementary or primary coloured light rays.

While we have illustrated the application of our invention to an outdoor advertising sign of bulletin type, it is to be understood that the disclosure is for purposes of exemplification only and that the novel aspects of our invention may be incorporated in a wide range of displays. For this reason a very brief description of the display bulletin per se will suffice.

Figure 1:
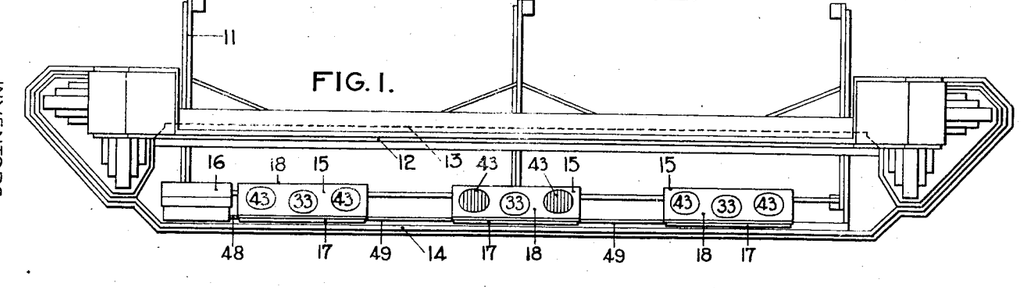
Figure 2:
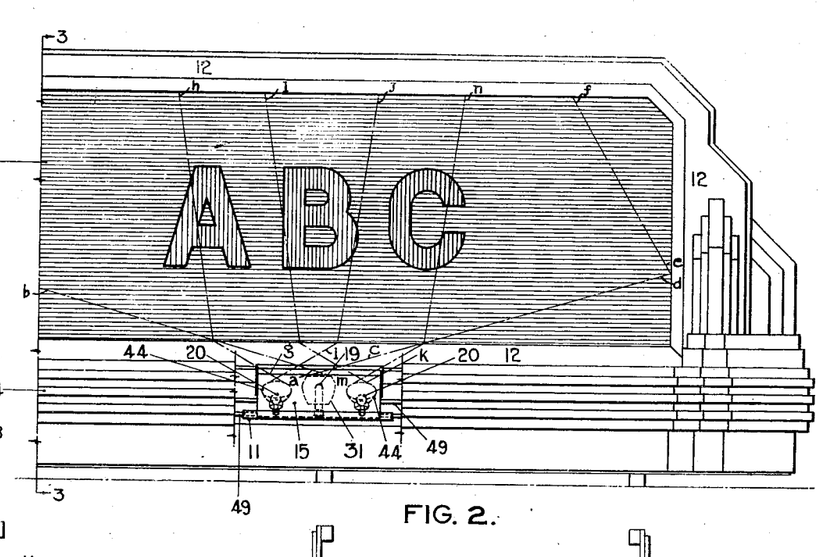
Fig. 2 is a partial front elevation of such display, the surface of which bears portions coloured in accordance with salient aspects of this invention.
Figure 3:
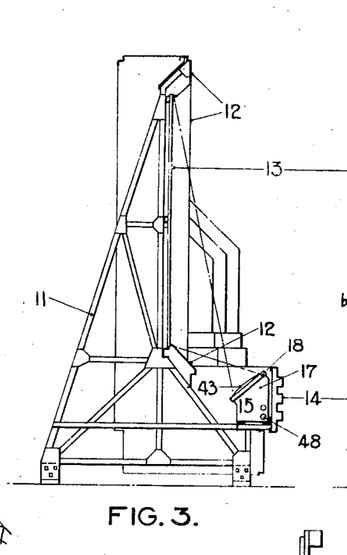
Fig. 3 is a vertical end sectional elevation of the display, as viewed on the plane indicated by the section line 3—3 appearing on Fig. 2.

Referring first to Figs. 1, 2 and 3 of the drawings, the numeral 11 designates the bulletin frame structure generally; the reference character 12 indicates the ornamental structure which borders the display surface 13; and 14 represents the open base which serves to conceal from view, at normal eye level, the display surface illuminating equipment and its control apparatus.

The aforesaid equipment comprises a plurality of illuminating units generally designated in Figs. 1, 2 and 3 by the numeral 15 and control apparatus therefor which is arranged within the housing indicated broadly by reference character 16. This equipment is mounted on the bulletin frame structure 11 immediately behind the panel forming part of the base 14 and in a vertical plane forward of the display surface 13 a distance sufficient to afford an efficient path of light beam projection from the illuminating units 15 to the said display surface.

Figures 4, 5, 6:
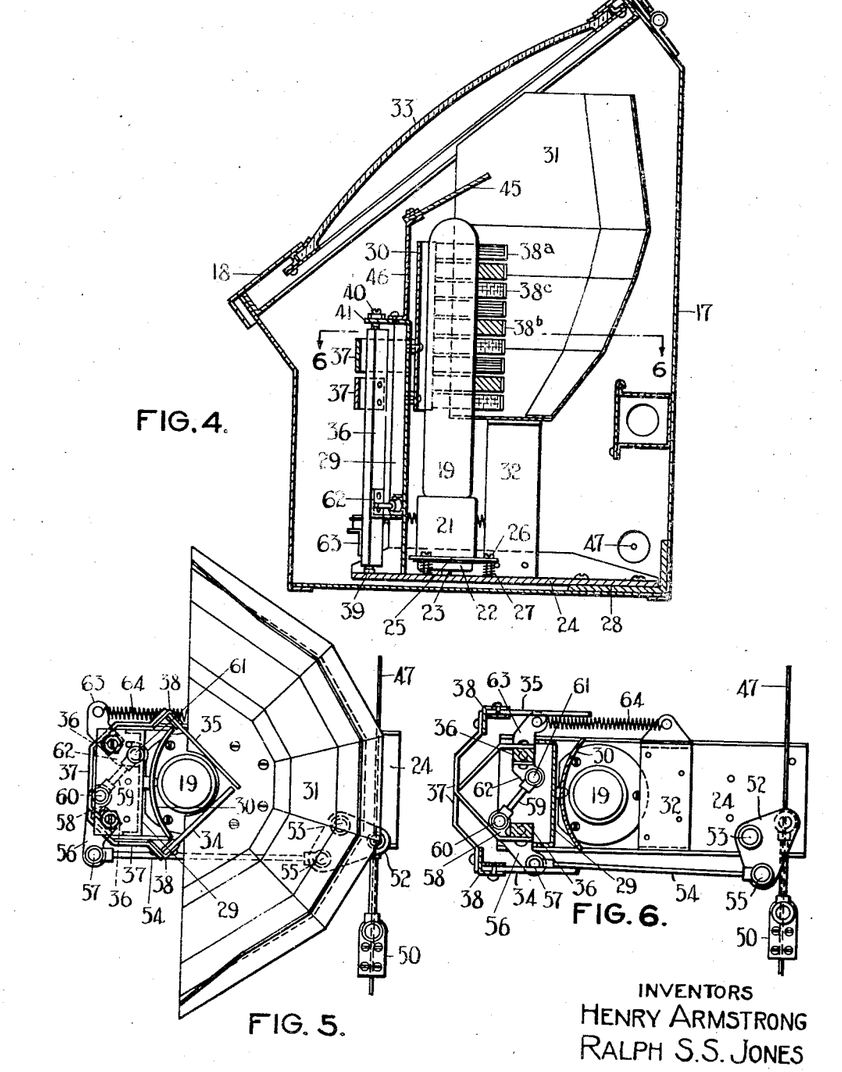
Fig. 4 is a vertical sectional view, partly in elevation, drawn to a larger scale than the aforesaid views, depicting a mercury vapour light source, reflectors and filtering apparatus of one of the illuminating units.
Fig. 5 is a top plan view of the mercury vapour light source, reflectors and filtering apparatus shown in Fig. 4.
Fig. 6 is a sectional plan view, similar to Fig. 5, taken on line 6—6 of Fig. 4, showing the filtering apparatus in non-filtering position.
Figure 7:
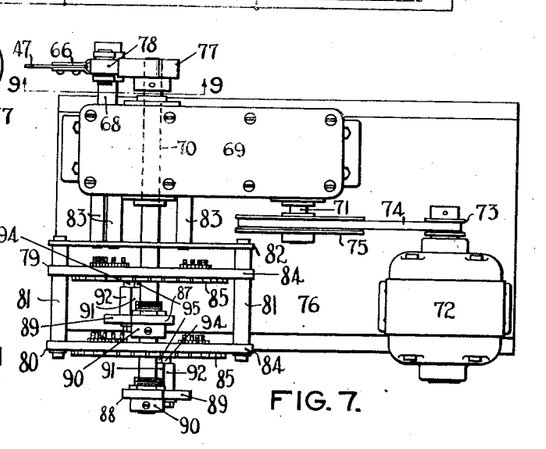
Fig. 7 is a top plan view of part of the apparatus employed to govern transmission of radiation from light sources to the display surface.
Figures 8, 9:
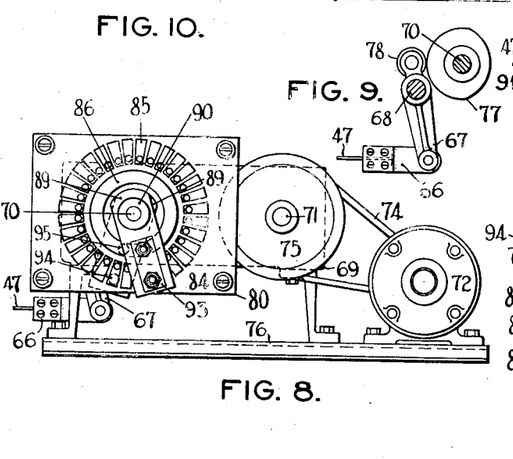
Fig. 8 is a side view of the apparatus shown in Fig. 7.
Fig. 9 is a detail showing the timing cam and actuating lever, forming part of the apparatus shown in Figs. 7 and 8, and employed to govern operation of mercury-vapour light source filters.

Each illuminating unit generally designated in Figs. 1, 2 and 3 by the numeral 15 includes a housing in the form of a base section 17 and a cover 18 hinged thereto, best shown in Fig. 4. Within each said housing, substantially centrally thereof, there is arranged a mercury vapour electric discharge light source, hereinafter referred to as the mercury vapour lamp, designated by the numeral 19. At each side of the said mercury vapour lamp, there is mounted an incandescent electric lamp 20. The arrangement of the aforesaid lamps is clearly shown in Fig. 10, in which three groups of lamps are shown, one for each of the illuminating units 15 shown in Fig. 1.

The mercury vapour lamp 19 of each said illuminating unit is mounted vertically with its base downwardly in the socket 21. This socket is secured to a vertically aligning base comprising the socket cap 22 pivoted on pin 23 fixed to the base 24, the plate 25 arranged between the said socket and its cap, the adjusting screws 26 which extend through plate 25 and are threaded into base 24, and the springs 27 on screws 26, which springs are located between plate 25 and base 24. By such device, the aforesaid socket and the lamp which it supports may be tilted to a limited degree in any direction by manual adjustment of screws 26, and the lamp 19 may be thus aligned vertically in relation to the radiation filters and co-related components presently referred to. The base 24 is fixed to the reinforcing angle 28 which extends longitudinally of the housing base 17. The said base supports the vertical base member 29 rigidly fixed thereto, and the latter member forms part of the supporting means for the radiation filters.

The radiation reflecting means associated with each mercury vapour lamp 19 comprises a primary reflector 30 mounted in fixed relation with respect to the vertical base member 29, and a secondary reflector 31 supported by member 32 mounted on base 24.

The aforesaid reflectors comprise the means arranged to direct the light rays emanating from the mercury vapour lamp 19 toward the display surface 13 and to distribute it substantially uniformly over the said display surface. Reflector 30 is a panel of reflecting material concave in its transverse plane in respect to the mercury vapour lamp 19. Its function is to intercept in substantially horizontal planes, radiations from the mercury vapour lamp 19 which do not impinge the secondary reflector 31 and reflect such radiations toward said secondary reflector. The latter is composed of a plurality of substantially flat panels of reflecting material arranged in a plurality of tiers each of which includes a plurality of panels. Each tier is symmetrically disposed around an assumed vertical axis of the mercury vapour lamp 19, as shown in Fig. 4. These panels are arranged to intercept the maximum amount of radiations emanating from the said mercury vapour lamp and to direct same in an efficient manner through the lens 33 mounted in each illuminating unit housing cover 18 over the mercury vapour lamp 19, to the display surface 13. Radiation directed by the primary reflector 30 towards the secondary reflector 31 is similarly directed through the lens 33 to the said display surface. Lens 33 includes a multiplicity of narrow prisms arranged in parallelism, which extend across said lens in a direction substantially transversely of each said illuminating unit housing. The laterally diverging beam of light reflected from the secondary reflector is further broadened in the longitudinal vertical plane of the display surface 13 and extends substantially to the area outlined in part by broken lines a—b; c—d and e—f. The narrow angular distribution of the light in the above transverse plane and the large angular distribution in the above longitudinal plane promotes economy of illuminating energy and uniformity of illumination.

Radiation emanating from the mercury vapour lamp 19 of each illuminating unit 15 is cyclically filtered to intermittently reduce the apparent intensity of reflection of mercury vapour radiation from the display surface to the eyes of the observer, and during each such cycle event of diminished intensity of reflection, radiation is transmitted to the said display surface from the incandescent lamps 20. The filtering means above referred to is preferably in the form of two vertically pivoted oscillatable filters 34 and 35, each of which includes a vertical pivot bar 36, an arm 37 fixed thereto and extending therefrom to the filter section angle frame 38, and a plurality of filter sections 38ª, 38ᵇ and 38ᶜ supported by the latter. The two filter pivot bars 36 are arranged vertically in spaced parallel relation and are pivoted at their lower ends on pins 39 fixed to the base 24, and at their upper ends on the adjustable pivot screws 40 which are threaded through the lateral extension 41 of the base vertical member 29. The filter components aforesaid are co-related in such manner that the said filters generally designated at 34 and 35 may in filtering position be disposed in close relation with respect to the mercury vapour lamp 19 and the primary reflector 30, and serve to intercept transmission of a substantial portion of the radiation emanating from the said lamp and in part reflected by the primary reflector 30 toward the secondary reflector 31. Furthermore, the filter construction and pivoting arrangement is such that the filters may be retracted from out of filtering position, to the position depicted in Fig. 6.

The filtering media of each filter aforesaid consists of a plurality of narrow filter sections 38ª, 38ᵇ and 38ᶜ, mounted horizontally on the angle frame 38 in closely spaced relation. The said filter sections are preferably of a plurality of colours similar to colours predominant in the mercury vapour radiation, for example blue, green and yellow. The colour formation of said filters and the purpose of arranging the filter sections aforesaid in spaced relation will be elucidated as the description proceeds.

Each incandescent lamp 20 is supported by a socket 42 mounted in the housing base 17 in such manner that each said lamp is positioned beneath a lens 43 similar in formation to lens 33 associated with each mercury vapour lamp 19. A reflector 44 is arranged circumjacent each lamp 20 and its function is to direct radiation emanating from such lamp through lens 43 toward the display surface 13. Although reflectors of various designs may be utilized for this purpose, we prefer to use reflectors formed of a series of parabolae of revolution co-ordinated so as to efficiently direct the maximum radiation emanating from each lamp 20 through the prismatic lens 43 to the display surface 13. As in the case of the mercury vapour lamp 19 and the lens 33, the beam of incandescent light emanating from each lamp 20 in passing through the lens 43 is broadened so that a wide area of display surface 13 is uniformly flooded with radiation from each lamp. The co-relation of the two lamps 20 of each illuminating unit 15 is such that the light beams emanating therefrom flood display surface areas depicted by broken lines g—h and i—j, and k—l and m—n, which areas overlap in such manner as to afford an appearance of substantially uniform intensity of illumination. The illuminating units 15 are co-related in such wise that radiation emanating from the lamps 19 and 20 of the said units is reflected and spread out in the form of light beams which so overlap that an appearance of substantially uniform display surface illumination is afforded.

Referring again to Figs. 4, 5 and 6, a transparent filter or screen 45 is positioned above the mercury vapour lamp 19 of each illuminating unit 15, and is supported by the bracket 46. Said filter is preferably in the form of a blue, green or yellow section of glass, or a plurality of sections of the colours referred to. The function of this filter or screen 45 is to reduce the intensity of radiation passing directly from the mercury vapour lamp 19 over the top of the primary reflector 30 toward the display surface 13.

As before referred to, the filters 34 and 35 are recurrently interposed in the radiation emanating from mercury vapour lamp 19. The actuating mechanism for the said filters comprises a longitudinally reciprocatable cable or wire 47 which extends from the control apparatus housing 16 through pipe 48, the base sections 17 of each illuminating unit 15 and the pipes 49 interconnecting said housing base sections. Within each illuminating unit 15 the wire 47 is fastened to a clamp 50 which is articulated by a link 51 to the bellcrank 52, the latter being hinged or pivoted at 53 on the base 24. This bellcrank 52 is interconnected by the link 54 articulated thereto as at 55, to the lever 56, being hinged or pivoted to the latter as at 57. The lever 56 is fixed to the pivot bar 36 of filter unit 34. A second lever 58 is mounted on pivot bar 36 of filter unit 34 and is articulated to link 59 as at 60. Link 59 is articulated as at 61 to lever 62 mounted on pivot bar 36 of filter unit 35. A second lever 63 is mounted on pivot bar 36 of filter unit 35. A retractable coil spring 64 is connected at one end thereof to lever 63 and its opposite end is connected to bracket 65 mounted on member 32. It is to be understood that the filter mechanism of each mercury vapour lamp 19 of each illuminating unit 15 is equipped with control mechanism such as illustrated in Figs. 4, 5 and 6 and previously described, and that the link 51 of each such mechanism is interconnected by clamp 50 to the common drive cable or wire 47, which is actuated by the control apparatus arranged within the housing 16 and presently described.

The end of the drive wire 47 extending into the housing 16 is articulated by a link 66 to the lower end of a lever or rocker arm 67, which in turn is free to oscillate on the trunnion or stud 68 fixed to and extending from the speed reducer 69. The latter device includes a main rotatable drive shaft 70 extending from both sides thereof, and this drive shaft is driven through a gear train, not shown, enclosed within the speed reducer 69 and powered from the pulley shaft 71. The latter shaft is powered by the electric motor 72 through motor pulley 73, belt 74 and pulley 75 fixed to shaft 71. The mechanism described is mounted on a base 76 adapted to be arranged within the housing 16. A cam 77 is mounted on one end of the speed reducer drive shaft 70 in alignment with the roller 78 of lever 67. The profile of cam 77 is such that the lever 67 is oscillated during each revolution of said cam and it follows therefore that upon each cam revolution the drive wire 47 is reciprocated under retractile effort of springs 64.

In order to co-relate the action of the filter units 34 and 35 of each mercury vapour lamp 19 of each illuminating unit 15 with electrical energization of the incandescent lamps 20, the radial switches governing energization of said incandescent lamp 20 are co-related with the speed reducer drive shaft 70, which in turn carries the mercury vapour lamp filter mechanism actuating cam 77. The incandescent lamps 20 are of the "twilight" three intensity type with each of which a three contact mogul type socket 42 is used. Each lamp 20 is connected to two separate circuits and each said circuit is controlled by a separate radial switch, with the result that each radial switch breaks substantially one half of the electrical circuit. By this arrangement the electrical circuits are substantially balanced when using three wire service and flexibility is added to the control of emitted radiation.

The radial switch mechanism consists primarily of two radial switches generally designated by the numerals 79 and 80, which switches are mounted in relative spaced relation and are supported by the studs 81 extending from the base plate 82, which in turn is supported by a plurality of studs 83 extending from the speed reducer 69. Each radial switch aforesaid comprises a plate 84 of non-conductive material such as "Bakelite" or its equivalent, and the speed reducer drive shaft 70 extends substantially centrally through both said plates. Contact plates 85 of sector formation are mounted on each plate 84 and are arranged each at an equal radial distance from the axis of drive shaft 70 and in uniform relative spaced relation. A collector ring 86 is mounted on each switch plate 84 concentrically with respect to the axis of drive shaft 70. A brush mechanism is co-related with each radial switch plate above referred to, being generally designated by the numerals 87 and 88. Each brush mechanism referred to includes an arm 89 of non-conductive material mounted upon an adjustable collar 90 which in turn is secured to the drive shaft 70, two brush holders 91 and 92 interconnected by the conductor strip 93; and the brushes 94 and 95 which are spring urged against the contact plates 85 and the collector ring 86 respectively.

The electric circuits for the lamps 19 and 20 may be considered as being connected to an electric power company's three wire 115-230 volt alternating electric service and therefore provided with the customary entrance fused service switch, electric time switch for "on and off" operation, and a distribution arrangement to protect the individual branch circuits. All of the above equipment is of course assumed as being necessary and for simplicity of this disclosure all electrical apparatus is shown as being connected to the three service conductors designated at 96, 97 and 98 in Fig. 10. Conductor 97 is assumed to be the neutral or ground conductor.

Figure 10:
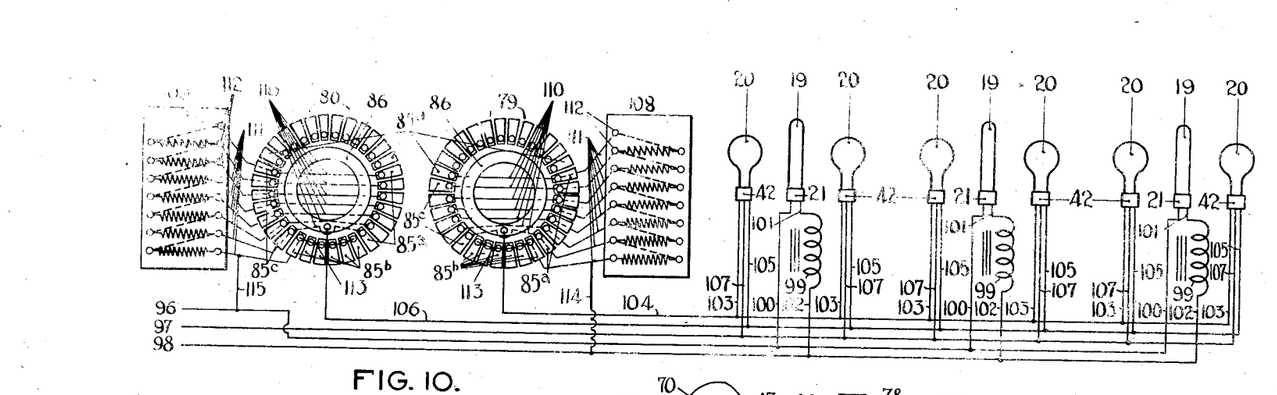
Fig. 10 is a circuit diagram of the light sources and control means for certain of such light sources.

Mercury vapour lamps 19 are preferably of the high intensity type requiring use of regulating resistance or reactance devices generally designated at 99. The mercury vapour lamp circuit comprises conductor 96 connected to conductor 100 which leads to each mercury vapour lamp socket 21. Conductor 101 leads from each socket 21 to the reactance device 99 of each mercury vapour lamp 19. Conductor 102 leads from each reactance device 99 to conductor 98, thereby completing the electrical circuit for the mercury vapour lamps 19.

Incandescent lamps 20 are arranged in the electrical circuit with one filament of each lamp connected to conductor 103 which in turn is connected to the common conductor 104. The other filament of each said lamp is connected with conductor 105 which in turn is connected to common conductor 106. The junction of the two filaments within each lamp connects by conductor 107 to conductor 97. By this circuit arrangement individual lamp filaments while connected in parallel are per se connected in series with a radial switch aforesaid and a resistance unit. For example, one group of individual lamp filaments is connected in series with radial switch 79 and resistance unit 108; and the other group of individual lamp filaments is connected in series with radial switch 80 and resistance unit 109.

The radial switches 79 and 80 are each arranged with conductors 110 connecting horizontally opposed contact plates 85. Conductors 111 connect contact plates 85 to the respective terminals 112 on the resistance unit 108. Thus a predetermined amount of resistance wire is connected across adjacent contact plates 85ª. Conductor 104 connects one set of lamp filaments to collector ring 86, brush 95, brush holder 91, conductor strip 93, brush holder 92 and brush 94, and to preselected contact plates 85ª, 85ᵇ, 85ᶜ and 85ᵈ, conductor 113 interconnects contact plates 85ᵇ. Conductor 114 connects conductor 98 with conductor 111 as illustrated.

When the brush 94 is in the position contacting the contact plate 85ᵈ the circuit is discontinuous and the plurality of incandescent lamp filaments forming one filament group are not energized. As the brush 94 advances in clockwise direction and contacts the nearest contact plate 85ª it connects the aforesaid filament group in series with the full resistance of the resistance unit 108. As the said brush continues to advance in the same direction it progressively drops off resistance as it passes each contact plate 85ª until finally as it leaves contact plates 85ª the resistance is fully dropped. The brush 94 continues to travel in the same direction and while contacting contact plates 85ᵇ the resistance remains out of circuit. The said brush continues to travel and contacts contact plates 85ᶜ. As it passes contact plates 85ᶜ it continues to add resistance to the circuit until at the last traversed contact plate 85ᶜ the resistance is fully in circuit. As the said brush leaves the last contact plate 85c the circuit is broken and the resistance and in turn lamp filament energization cycle is completed.

In contra-distinction to the circuit of radial switch 79, the circuit of radial switch 80 includes a conductor 115 which connects conductor 111 to conductor 96.

The function of the brush of radial switch 80 is identical with that of the brush of the radial switch 79. It is noteworthy, however, that the brush of radial switch 80 is retarded clockwise with respect to the brush of radial switch 79, wherefore the energization and de-energization cycles of the respective groups of lamp filaments aforesaid are not synchronized. Due to the foregoing, the beams of light emanating from the respective groups of lamp filaments build up and diminish one after the other in such manner that step-by-step lamp filament energization and de-energization is not perceptible in the radiation transmitted to the display.

Because the method of display illumination herein disclosed effects transmission to the display surface 13 of all the primary spectrum colours and a wide range of non-neutral colour shades and hues, the colour treatment of the said display surface is not confined to any particular scheme as regards co-relation of object representation and background, and the colour values of one or the other. A very simple form of display is shown in Fig. 2, in which the display surface 13 is formed of a blue background and red indicia represented by the characters A, B and C, and reference will be had thereto in the description which follows, for simplicity of explanation.

During each period of display illumination, for example from dusk until midnight, the electric motor 72 and the mercury vapour lamps 19 are continuously energized, and the filaments of the incandescent lamps 20 are intermittently energized due to operation of the radial switches 79 and 80. Thus radiation of line spectrum character emanating from the mercury vapour lamps 19 is continuously transmitted to the display surface 13, and radiation containing shades of colour deficient in the mercury vapour radiation is transmitted in recurrent cycles from the incandescent lamps 20 to the said display surface.

In greater detail, let it be assumed that the cam 77-roller 78 relation and the radial switch 79—80 to brush 94 relation is as illustrated. At this moment during an illuminating cycle, the filter units 34 and 35 of each illuminating unit are in filtering position as shown in Fig. 5. Radiation emanating from each mercury vapour lamp 19 is in part filtered in passage to the display surface, but the colour characteristics of the transmitted radiation are substantially identical with that of non-filtered radiation due to use of blue, green and yellow filter sections and the spaced relation of such filter sections which permits transmission of sufficient non-filtered radiation to obliterate projection of shadow caused by interposition of the said filter sections in the radiation. The said filters serve to reduce the amount of mercury vapour radiation transmitted to the said display surface to the degree that the radiation co-incidentally transmitted from the incandescent lamps 20 to the said display surface renders red and red-orange display surface colours very dominant and brilliant.

Assume that the motor 72 is energized and that in turn the speed reducer drive shaft 70, the cam 77 and the brushes 94 are revolving. As the cam 77 revolves, the roller 78 rides from off of the apex thereof to the cam root, thus permitting the rocker arm to shift to the left. This movement is caused by contraction of the springs 64 and as a result the filter units 34 and 35 are shifted from the closed position shown in Fig. 5 to the open position shown in Fig. 6. In the latter position, the said filter units are retracted from out of the mercury vapour radiation emitted from the mercury vapour lamps 19, with the result that non-filtered mercury vapour radiation is transmitted to the display surface 13. Immediately before the filter units shifted from filtering to non-filtering position, due to action of the brushes 94, resistance is built up and radiation emitted from the incandescent lamps 20 reduces progressively until incandescent lamp radiation transmission to the display surface is terminated.

Now let it be assumed that the display surface 13 is subjected to strong extraneous incidental light. Due to the fact that the said display surface is now flooded with non-filtered beams of mercury vapour radiation of high intensity, all red and red-orange display surface colours appear to be dark brown. As the speed reducer drive shaft 70 continues to revolve, the cam 77 causes the lever 67 to shift to the right and in consequence the drive wire is pulled in the same direction. This motion causes the filter units 34 and 35 to again close or in other words, again become interposed in the mercury vapour radiation, as illustrated in Fig. 5. Simultaneously, resistance is dropped out of the incandescent lamp circuits and the filaments of lamps 19 again become energized and incandescent lamp radiation is again transmitted to the display surface 13. Since the mercury vapour radiation at this cycle event is partially filtered, the incandescent radiation is dominant and red and red-orange display surface colours appear to be very brilliantly illuminated, each in its natural noon sunlight colour. Thus an illuminating cycle is completed.

Due to the deficiency of red and red orange wave bands in mercury vapour radiation, and the continuous spectrum of incandescent lamp radiation, use of radiation from these two types of lamps may be very effectively utilized in the manner described to afford an appearance of recurrent display surface colour transformation and/or object representation indicia animation. In such localities where extraneous incidental light is not a detrimental factor, or in such cases where very vivid red and red-orange light reflection is desired, red filter lens may be used instead of transparent or translucent lens 43, as illustrated in Fig. 1, wherein the central illuminating unit 15 is depicted as having red filter lenses 43.

The use of filter sections of blue, green and yellow colours are depicted in Fig. 4. For certain types of display copy the filter sections of different non-neutral colour to the above would provide better colour fluctuation. For instance in Fig. 2, the blue background area of display surface 13 would appear of greater brilliance with all blue filter sections when the filter units are in closed position.

We claim:

1. The method of illuminating a display surface bearing contrastingly different shades of non-neutral colours to produce varying visual impressions, which method consists in continuously transmitting radiation from a light source of line spectrum character to the display surface, which radiation contains shades of colour similar to shades of colour of the display surface and is deficient in one of the display surface and tri-chromatic colourimeter colours, intermittently interposing media in the radiation emitted from the said light source to reduce the apparent intensity of such radiation transmitted from the display surface to the eye of the observer, and transmitting radiation from a light source emitting a light beam containing a shade of colour which is deficient in the radiation emitted from the aforesaid light source and embodied in the display surface, to the display surface during each aforesaid period of display surface illumination intensity reduction.

2. The method of illuminating a display surface which bears contrastingly different shades of non-neutral colours, to produce varying visual impressions, which method consists in continuously transmitting radiation from a light source of line spectrum character to the display surface, which radiation contains shades of colour similar to shades of colour of the display surface and is deficient in one of the display surface and tri-chromatic colourimeter colours, intermittently interposing a colour filter in the radiation emitted from the said light source to absorb at least one shade of colour of transmitted light, and transmitting a beam of light predominantly of a shade of colour which is deficient in the radiation emitted from the aforesaid light source and contained in the tri-chromatic colourimeter and the display surface, to the display surface during each filtration period.

3. The method of illuminating a display bearing contrastingly different shades of non-neutral colour to produce varying visual effects, which method resides in cyclic flooding of the display with a plurality of beams of coloured light, each of which illuminating cycles includes continuous projection of a beam of light of variegated spectral character containing a plurality of shades of colour similar to shades of colour of the display but deficient in one contrastingly different display colour, subsequent filtration of such projected light beam to reduce the extent of apparent chromatic variegation thereof, and co-incident projection of a beam of light predominantly of a shade of colour which is deficient in the filtered light beam and embodied in the display.

4. A method of producing varying visual impressions of a display surface bearing a plurality of shades of non-neutral colour, which method includes subjecting the display surface to radiations containing shades of colour analogous to shades of colour of the display surface, which radiations are emitted from a light source of substantially line spectrum character, and cyclically intercepting transmission of a predetermined portion only of such radiations to the display surface.

5. A method of illuminating a display surface embodying background and indicia areas formed of shades of colour of different spectral absorption and reflection characteristics to produce cyclically varying visual effects, which method consists in flooding the display surface during one period of an illuminating cycle with beams of light of different wave lengths and analogous to shades of colour contained in the display surface, such that the display surface background and indicia areas reflect radiation in such manner that the said areas are visually conspicuous and an indicia area appears to be predominantly brilliant with respect to a background area, and flooding the display surface during another period of the same illuminating cycle with non-filtered radiation emitted from a light source of substantially line spectrum character whereby a background area appears to be predominantly brilliant with respect to an indicia area.

6. The method of producing varying visual effects upon a display surface bearing non-neutral and dissimilarly coloured background and indicia areas, which method consists in flooding the display surface with beams of light containing shades of contrastingly different colours analogous to shades of colour of the display surface, and cyclically varying the characteristics of such beams of light in such manner that at one moment during an illuminating cycle the aforesaid background and indicia areas are illuminated with light of substantially continuous spectrum and during another portion of the same illuminating cycle the background areas are illuminated with light of non-continuous spectrum emitted from light sources of line spectrum character, thereby producing a visual effect of apparent substantially greater intensity of illumination than during the aforesaid period of the illuminating cycle.

7. A method of affording varying visual impressions of a chromatically variegated display, which method consists in illuminating the display with radiation emitted from a mercury vapour electric discharge light source, and intermittently interposing filtering media in the path of the emitted radiation to intermittently absorb part of the radiations in transmission to the display.

8. The method of illuminating a display surface bearing background and object representation areas of contrastingly different shades of non-neutral colour, to produce an appearance of display surface object representation animation and continuous substantially non-flickering brilliant illumination, which method consists in continuously illuminating the said display surface with a plurality of spectral line character wave bands emitted from a substantially line spectrum character gaseous electric discharge light source, and intermittently lowering the degree of intensity of display surface illumination thereby, and illuminating the said display surface during each said period of lowered intensity illumination, with substantially white radiation emitted from an incandescent electric light source, which radiation contains a shade of colour predominant in the said display surface and deficient in the line spectrum character of the aforesaid radiation.

9. The method of illuminating a chromatically variegated display surface to produce varying visual impressions, which method consists in continuously transmitting radiation from a light source of line spectrum character to the display surface, which radiation contains shades of colour similar to shades of colour of the display surface and is deficient in one of the display surface and tri-chromatic colourimeter colours, filtering out a portion only of the radiation emitted from the said light source and transmitted to the said display surface, and transmitting radiation from a light source emitting a light beam containing a shade of colour deficient in the radiation emitted from the aforesaid light source and embodied in the display surface, to the display surface during each aforesaid filtration event.

10. The method of illuminating a chromatically variegated display surface to produce varying visual impressions, which method consists in continuously transmitting radiation from a light source of line spectrum character to the display surface, which radiation contains shades of colour similar to shades of colour of the display surface and is deficient in one of the display surface and tri-chromatic colourimeter colours; intermittently transmitting radiation to the said display surface from a light source emitting a beam of light containing a shade of colour deficient in the radiation emitted from the aforesaid light source; and establishing filtration of the light beam emitted from the first said light source whereby radiation emitted from the second said light source to the display surface and reflected in part to the eye of the observer is of such high intensity that those portions of the display surface, which embody shades of colour analogous to shades of colour contained in radiation emitted from the second said light source, appear to be brilliantly illuminated.

11. In an illuminated display of the character set forth, the combination with a display surface embodying contrastingly different non-neutral shades of colour, of apparatus arranged to flood the said display surface with cyclically changing beams of light to produce varying visual impressions, which apparatus includes means to intermittently flood the said display surface with non-filtered spectral radiation substantially deficient in one of the display surface colours and one of the colours of the tri-chromatic colourimeter; further means arranged to co-act with the aforesaid means to filter such radiation following each aforesaid intermittent event of illumination to reduce the apparent intensity thereof, and additional means arranged to flood the said display surface during each filtration event aforesaid with radiation containing a colour deficient in the filtered radiation and embodied in the said display.

12. In an illuminated display of the character set forth, the combination with a display surface comprising contrastingly different coloured portions of non-neutral character, of apparatus arranged to illuminate the said display surface to produce cyclically varying visual impressions, said apparatus comprising a light source adapted to flood the said display surface with a beam of light of variegated spectral character analogous to shades of colour contained in the said display surface and deficient in one contrastingly different display surface colour; filtering media; motivating means arranged to intermittently interpose said filtering media in the path of the light beam emitted from the said light source; a second light source adapted to emit radiation predominant in one display surface colour and deficient in a shade of colour contained in the radiation emitted from the aforesaid light source; and means arranged to govern transmission of radiation from the second light source to the said display surface, operable in timed relation with the said filtering media motivating means in such wise that radiation is transmitted from the said second light source to the said display surface during each cycle event said filtering media is disposed in radiation filtering position.

13. An illuminated display comprising a display surface bearing contrastingly different shades of pigment colour, and apparatus arranged to establish selective reflection from the said display surface of light of different shades of colour analogous to display surface colours during alternated periods to afford an appearance of display surface animation, which apparatus includes a radiating source of substantially line spectrum character, means arranged to periodically decrease the apparent intensity of reflection of radiation from the said display surface, which radiation is emitted from the said radiation source, and further means arranged to subject the said display surface during aforesaid periods of apparent decreased intensity of reflection, to radiation contrastingly different in colour to the aforesaid radiation and analogous to one of the shades of colour of the display surface.

14. A display bearing contrastingly different shades of non-neutral colour, and means arranged to illuminate the said display and cyclically vary characteristics of such illumination to produce varying visual effects, said means including a light source adapted to emit radiations of substantially line spectrum character, and means associated with the said light source arranged to cyclically impede transmission to the said display surface of a predetermined portion only of such radiations.

15. In combination, a display surface bearing different shades of non-neutral colour, and means arranged to illuminate the said display surface and cyclically vary characteristics of such illumination to produce varying visual effects, which means includes a light source of line spectrum character, reflecting means associated with the said light source arranged to reflect radiation emitted from the said light source to the said display surface, and a movable filter arranged to intermittently intercept transmission of a portion of such radiation from the said light source to the said reflecting means.

16. In combination, a display surface bearing different shades of colour, and means arranged to illuminate the said display surface and cyclically vary characteristics of such illumination to produce varying visual effects, which means includes a light source, a reflector associated with the said light source adapted to reflect radiation emitted from the said light source to the said display surface, movable colour filtering media arranged to be intermittently interposed between and retracted from between the said light source and the said reflector, the said filtering media being so formed and arranged that at all times it permits passage of a substantial portion of radiation traveling from the said reflector to the said display surface.

17. In the art of illuminated displays, in combination, a display surface and a plurality of illuminating units arranged to illuminate the said display surface, each of which units includes a light source, an oscillatable colour filter associated therewith, and motivating means including a prime mover arranged to actuate the said filters in synchronism.

18. In a display of the character described, a light source, a primary reflector, a secondary reflector, and light transmission governing means arranged to be intermittently interposed in radiation transmitted from the said primary reflector to the said secondary reflector.

19. In the art of display apparatus, in combination, a light source, a primary reflector, a secondary reflector, and a light filter arranged to be intermittently interposed in radiation transmitted from the said primary reflector to the said secondary reflector.

20. In the art of display apparatus, in combination, a primary light reflector; a secondary light reflector; a light source positioned between said reflectors; two oscillatable colour filters, one arranged at each side of said primary reflector, adapted to be moved into light ray filtering position between the said light source and the said secondary reflector and to be retracted from such position, and motivating means arranged to shift the said filters.

21. In the art of display apparatus of the character described, in combination, a tubular light source; a stationary reflector and two movable filters associated with the said light source, said filters being arranged one at each side of the said reflector and adapted to co-act with the said reflector to effect filtration of radiation emitted from the said light source and in part reflected by the said reflector, the said filters being arranged for recession from radiation filtering position to permit transmission of non-filtered radiation from the said light source and the said reflector, and motivating means arranged to recurrently shift the said filters.

22. In the art of display apparatus of the character described, in combination, a light source; a filter associated with the said light source arranged to be moved into and out of radiation filtering position; a second light source; means co-acting with the second said light source to control transmission of radiation therefrom; and apparatus arranged to actuate the said filter and govern operation of the last said means to effect recurrent filtration of radiation emanating from the first said light source and transmission of radiation from the second said light source during each filtration period.

23. In the art of display apparatus of the character described, in combination, a light source arranged to be continuously energized; a filter associated with the said light source arranged to be cyclically moved into and out of radiation filtering position; a second light source; means arranged to effect intermittent energization of the second said light source; and control apparatus arranged to effect recurrent movement of said filter and energization of the second said light source during part of each filtration cycle event.

24. A method of illuminating a display surface embodying background and indicia areas formed of shades of colour of different spectral absorption and reflection characteristics to produce cyclically varying visual impressions, which method consists in continuously flooding the display surface with radiation of line spectrum character and intermittently flooding the display surface with radiation of substantially continuous spectrum character.

25. A method of illuminating a display surface embodying background and indicia areas formed of shades of colour of different spectral absorption and reflection characteristics to produce cyclically varying visual effects, which method includes continuous flooding of the display surface with radiation of line spectrum character and intermittent flooding of the display surface with radiation embodying a shade of colour which is deficient in the radiation of line spectrum character.

26. A method of illuminating a display surface embodying background and indicia areas formed of shades of colour of different spectral absorption and reflection characteristics to produce cyclically varying visual impressions, which method includes continuous flooding of the display surface with radiation emitted from a mercury vapour light source and intermittent illumination of display surface indicia with radiation embodying a shade of red colour.

27. A method of illuminating a display surface embodying background and indicia areas including shades of colour of different spectral absorption and reflection characteristics to produce cyclically varying visual effects, which method includes intermittent flooding of the display surface with beams of light of different wave lengths and analogous to shades of colour of the display surface, such that display surface background and indicia areas reflect radiation in such manner that the said areas are visually conspicuous and an indicia area appears to be predominantly brilliant with respect to a background area, and flooding the display surface with radiation emitted from a light source of line spectrum character whereby a background area recurrently appears to be predominantly brilliant with respect to an indicia area.

28. In a display of the character set forth, the combination with a display surface embodying contrastingly different shades of colour, of apparatus arranged to flood the said display surface with cyclically changing beams of light to produce cyclically varying visual impressions, which apparatus includes means to continuously flood that said display surface with radiation deficient in one only of the colours of the trichromatic colourimeter, and additional means arranged to intermittently flood the said display surface with radiation containing a shade of colour which is deficient in the radiation emitted from the aforesaid means.

29. In a display of the character set forth, in combination with a display surface including contrastingly different shades of colour, of apparatus arranged to flood the said display surface with cyclically changing beams of light to produce cyclically varying visual impressions, which apparatus includes means to continuously flood the said display surface with radiation of line spectrum character and intermittently flood the said display surface with radiation of substantially continuous spectrum character.

30. The combination with a display surface including contrastingly different coloured portions of non-neutral character, of apparatus arranged to illuminate the said display surface to produce cyclically varying visual impressions, which apparatus includes a mercury vapour light source, an additional light source adapted to emit radiation embodying a shade of red colour, and means arranged to recurrently vary the intensity of radiation emitted from the last said light source and projected toward the said display surface.

HENRY ARMSTRONG.
RALPH S. S. JONES.